(12) United States Patent
Coleman et al.

(10) Patent No.: US 6,190,225 B1
(45) Date of Patent: Feb. 20, 2001

(54) CANDY HOLDING DEVICE

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Under 35 U.S.C. 154(b), the term of this patent shall be extended for 0 days.

(21) Appl. No.: 08/807,780

(22) Filed: Feb. 28, 1997

(51) Int. Cl.[7] ........................................................ A63H 3/00
(52) U.S. Cl. .................................................................. 446/73
(58) Field of Search ................................. 446/73, 71, 81, 446/207, 193, 197, 199, 210; 426/104, 134

(56) References Cited

U.S. PATENT DOCUMENTS

| | | | |
|---|---|---|---|
| 3,615,596 | * 10/1971 | Petti | 426/104 |
| 4,114,501 | * 9/1978 | Tanaka | 446/193 |
| 4,271,744 | * 6/1981 | Kuleza | 446/193 |
| 4,798,313 | * 1/1989 | Farley | 222/192 |
| 5,391,107 | * 2/1995 | Coleman | 446/484 |
| 5,395,278 | * 3/1995 | Dickhut | 446/486 |
| 5,536,054 | * 7/1996 | Liaw | 294/1.1 |
| 5,571,037 | * 11/1996 | Sellers | 446/188 |
| 5,586,681 | * 12/1996 | Policappelli | 220/674 |

* cited by examiner

Primary Examiner—Jacob K. Ackun
(74) Attorney, Agent, or Firm—Melvin L. Crane

(57) ABSTRACT

A novelty candy holding device for holding a lollipop and making croaking sounds by stretching and bending the main housing into various positions. The device comprises a main housing made of a hollow corrugated plastic or a solid material that is flexible, stretchable and bendable. The upper end of the main housing has a figure attached which has an aperture in the top. The aperture has an expandable sleeve to hold a lollipop. The figure can be made to resemble any form desired, for example, a person, an animal, etc. The lower end of the main housing can be made with an open end to enhance the croaking sound when the housing is stretched. A flat base is attached to the lower end of the main housing for a support and to hold the main housing in an upright position. The base can be made to resemble feet or any form desired. The device has also been designed so the lollipop can be replaced with any type of lollipop desired and the device can provide fun for children of all ages.

3 Claims, 1 Drawing Sheet

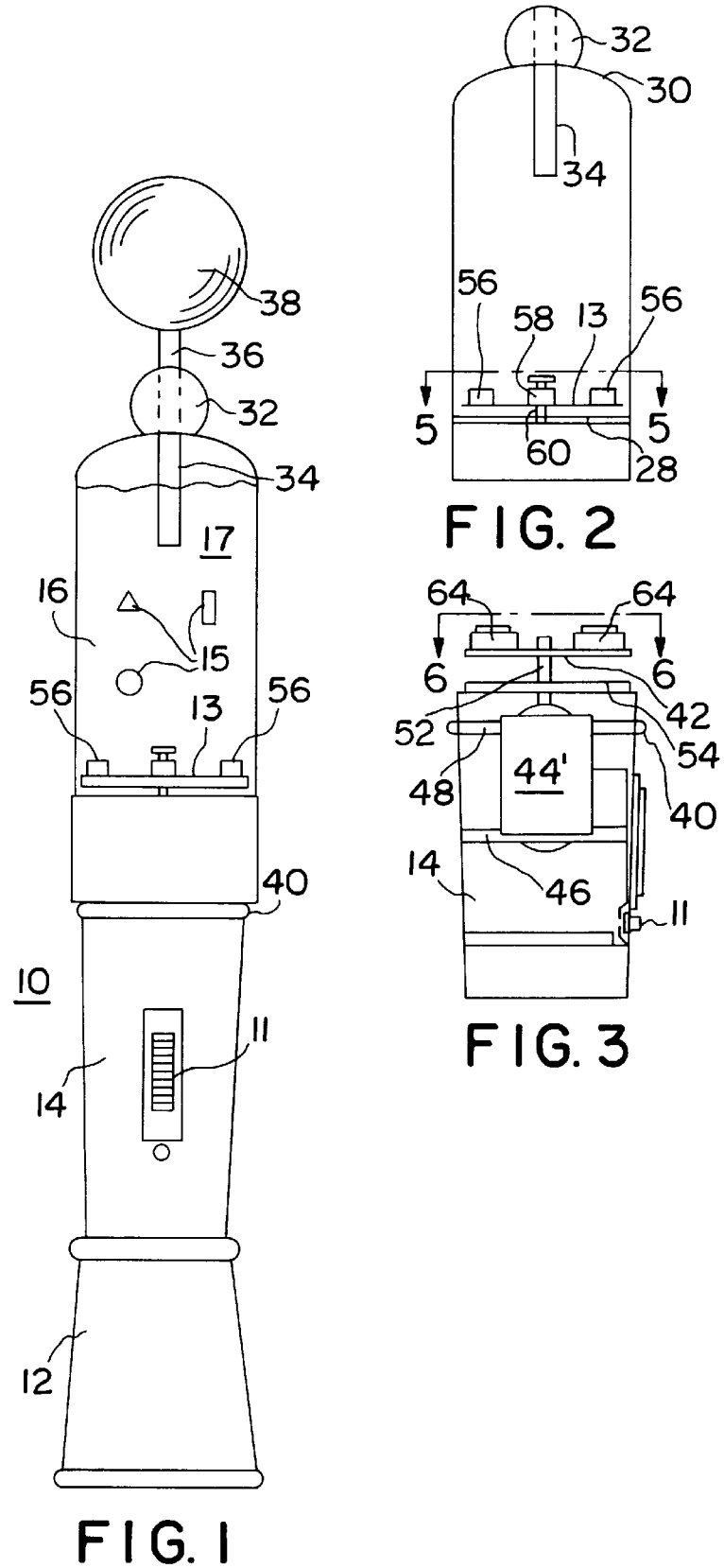

CANDY HOLDING DEVICE

This invention is directed to a novelty candy holding device which not only provides a sucker for use but which amuses a person by making a sound when the holder is bent or stretched.

PRIOR ART

No prior art is known to applicants which is similar to the invention. However, the following patents are cited as representative of the prior art: U.S. Pat. Nos. 3,645,038, 4,980,099, and 5,370,250.

BRIEF SUMMARY OF THE INVENTION

This invention sets forth an elongated body made of flexible and/or stretchable material that can be stretched or bent to make a noise during the deformation of the elongated body. The upper end of the body can be formed as different types of animals, persons, or any other configuration which can be pleasing to ones sight or in any way amuse a person. The upper end of the housing has an aperture for receiving an end of a sucker stick so that not only does the device amuse a person but it is useful for holding a sucker type candy.

It is therefore an object of the invention to provide a candy holder that is not only amusing but one that is used as a holder for a sucker.

Another object is to provide a candy holder which will make a noise when the holder is bent and/or stretched.

Still another object is to provide a candy holder in which the holder is made with a head and/or body with the likeness of an animal, a human, or any other design which can be amusing.

Other objects and advantages of the invention will become obvious from a review of the drawings and the specification.

DETAILED DESCRIPTION OF THE INVENTION

Figure 1:
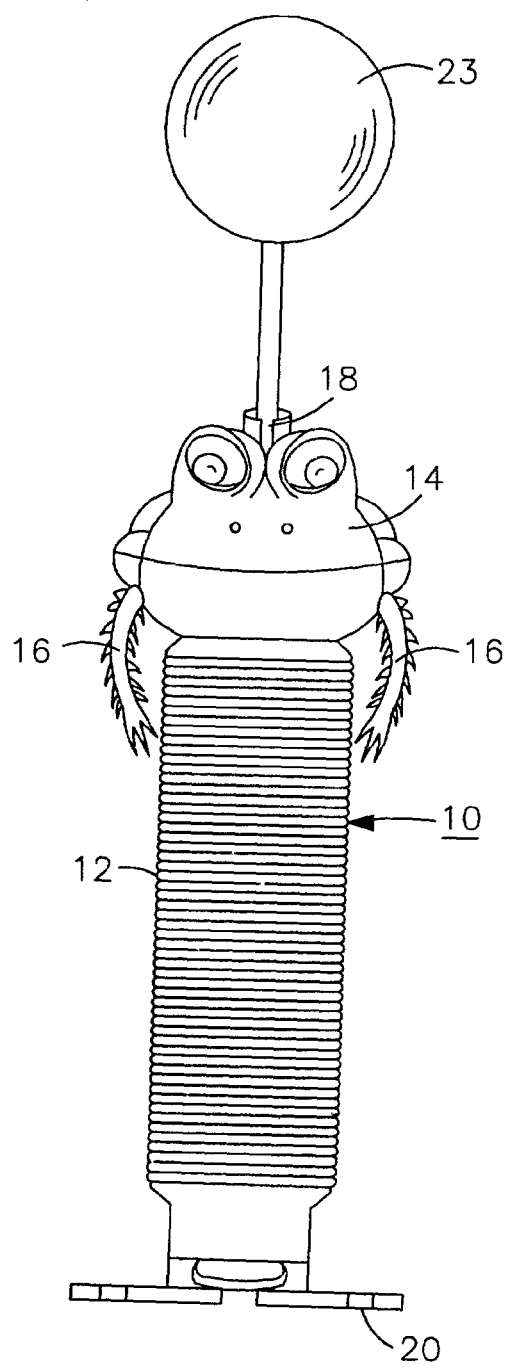
FIG. 1 is a front view of a candy holder having an amusing head and body which is holding a sucker.
Figure 3:
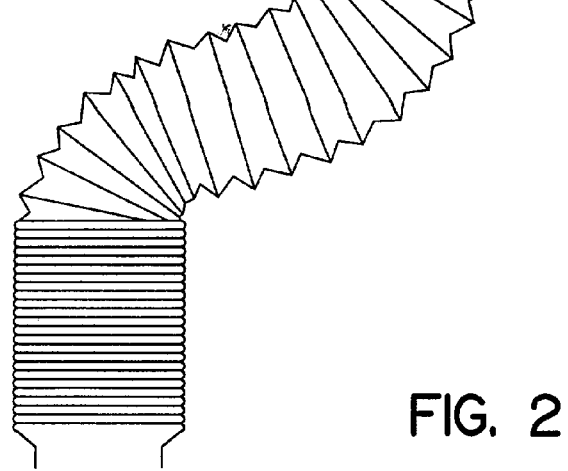
FIG. 3 is a bottom view of the device of FIG. 1 which illustrates a support for holding the device in an upright position as shown in FIG. 1.

Now, referring to the drawings, there is shown a front view of a candy holder 10 in an upright position. The candy holder includes a body portion 12 made of a hollow corrugated plastic or a solid material that is flexible. The material is of a type that will make a croaking-noise when stretched such as a hollow body or a solid body that makes a croaking noise when bent. If the body material is of a type that will not make a noise if stretched or bent, then a noise making device can be placed inside the body for making the noise when the body is stretched and/or bent. As shown in FIG. 1, the body 12 is made of a corrugated material with a figurine head 14 with side elements 16. The upper end of the figurine is provided with an aperture 18 which includes therein an expandable sleeve 19. The expandable sleeve is provided for reception of different, sized sucker sticks 21 and which will secure the sucker stick from falling out but which can be removed by a person. A sucker 23 is shown on the stick 21. The bottom of the housing has enlarged flat feet which support the device in an upright position. As seen in FIG. 3, the body is provided with an open bottom end through which some of the sound can flow to enhance the sound.

Figure 2:
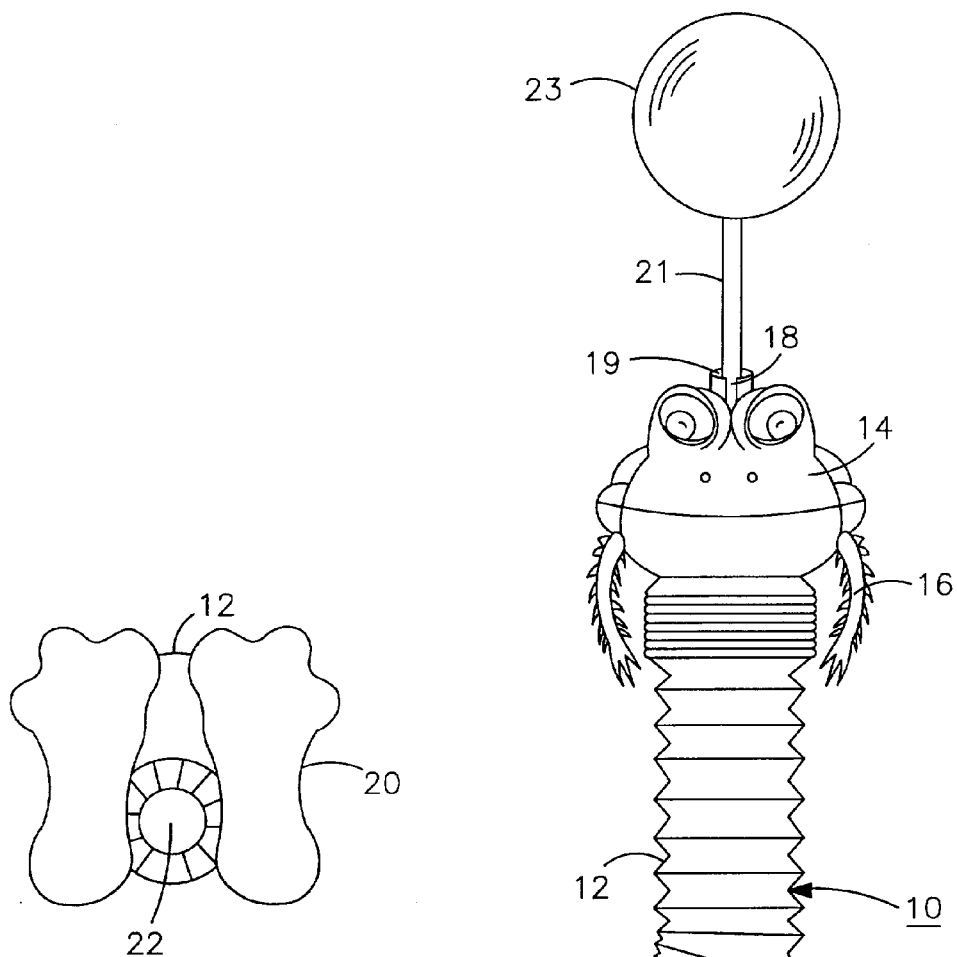
FIG. 2 illustrates the candy holder shown in FIG. 1 which has been stretched to make a noise during stretching.

FIG. 2 illustrates the body in a stretched condition after a croaking noise has been made during stretching the body portion. Obviously, if the body is made of a solid flexible material the body cannot be stretched but can be bent to make a noise. If the material will not make a noise if stretched or bent, then a noise maker must be placed inside of the body so that the device placed inside will make a noise when the body is stretched or bent.

As shown in FIG. 1, the material must be such that it will not bend on its own but will remain in an upright position so that the device can stand on its own. Also, the support as shown more clearly in FIG. 3 must be sufficiently flat and wide as to hold the device in an upright position. As shown, the feet appear large and wide such as worn by a clown.

In making the device, there must not be any sharp parts or any shaped parts that would injure a person or it must not be made of a material which would be harmful to a person in any way.

The device can be made with hollow expandable body parts besides the body 12. The head could have an expandable neck portion which would make a noise as the neck portion is stretched or bent. Further, the arms can be such that they are removable and of a hollow expandable material so that the arms will also make a noise as they are stretched or bent. The device could be made with multiple arms, multiple heads and/or multiple bodies and feet or with multiple appendages of any type.

The foregoing relates to preferred exemplary embodiments of the invention, it being understood that other variants and embodiments thereof are possible within the spirit and scope of the invention, the latter being defined by the appended claims.

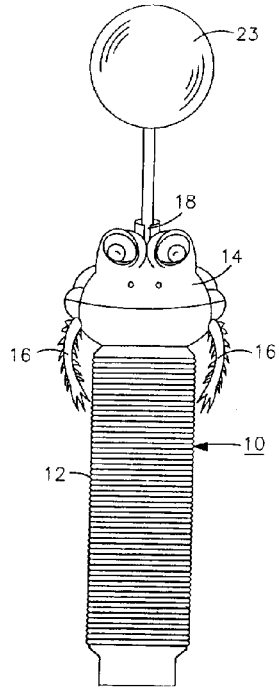

What is claimed is:

1. A novelty candy holding device which comprises a main housing, said main housing being made of a bendable and stretchable material by which a noise is made by said material during bending or stretching said material, said housing having an upper end with an aperture therein for receipt of a candy sucker stick, said aperture in said upper end includes an expandable sleeve for receipt of an end of said candy sucker stick, and said main housing has a head portion which resembles some form of life.

2. A novelty candy holding device as set forth in claim 1 in which said housing is of a hollow flexible stretchable material.

3. A novelty candy holding device which comprises a main housing, said main housing being made of a bendable and stretchable material by which a noise is made by said material during bending or stretching said material, said housing having an upper end with an aperture therein for receipt of a candy sucker stick, said main housing includes a separate noise maker secured therein which makes a noise due to flexing or stretching said housing and said noise maker therein.

* * * * *

UNITED STATES PATENT AND TRADEMARK OFFICE
CERTIFICATE OF CORRECTION

PATENT NO.    : 6,190,225 B1
DATED         : February 20, 2001
INVENTOR(S)   : Thomas J. Coleman et al.

It is certified that error appears in the above-identified patent and that said Letters Patent is hereby corrected as shown below:

Title page,
The title page showing the illustrative figure should be deleted to be replaced with the attached title page.

Drawings,
Drawing sheets, consisting of Figs. 1-4, should be deleted to be replaced with the drawing sheet, consisting of Figs. 1-4, as shown on the attached page.

Figure 4:
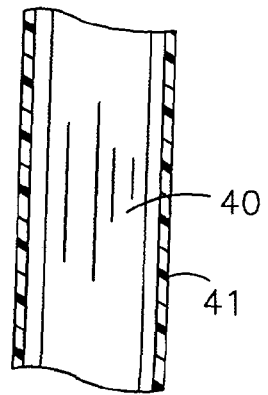

Column 1,
Line 44, after "stretching" delete "and";
Line 47, after "FIG. 1" delete the period and insert:
    -- and
    FIG 4 illustrates a noise maker in which the
    noise maker is within a bendable housing. --

Column 2,
Line 14, after "noise maker" insert -- 40 --;
Line 15, after "body" insert -- 41 --, and before "placed" delete "device" and insert -- noise maker --;
Line 16, before "bent" delete "stretched or".

Signed and Sealed this

Thirteenth Day of August, 2002

Attest:

JAMES E. ROGAN
Attesting Officer    Director of the United States Patent and Trademark Office

United States Patent
Coleman et al.

(10) Patent No.: US 6,190,225 B1
(45) Date of Patent: Feb. 20, 2001

(54) CANDY HOLDING DEVICE

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

(*) Notice: Under 35 U.S.C. 154(b), the term of this patent shall be extended for 0 days.

(21) Appl. No.: 08/807,780

(22) Filed: Feb. 28, 1997

(51) Int. Cl.$^7$ .................................................. A63H 3/00
(52) U.S. Cl. ........................................................ 446/73
(58) Field of Search .............................. 446/73, 71, 81, 446/207, 193, 197, 199, 210; 426/104, 134

(56) References Cited

U.S. PATENT DOCUMENTS

| | | | |
|---|---|---|---|
| 3,615,596 | * | 10/1971 | Petti .................................. 426/104 |
| 4,114,501 | * | 9/1978 | Tanaka ............................... 446/193 |
| 4,271,744 | * | 6/1981 | Kuleza .............................. 446/193 |
| 4,798,313 | * | 1/1989 | Farley ............................... 222/192 |
| 5,391,107 | * | 2/1995 | Coleman ........................... 446/484 |
| 5,395,278 | * | 3/1995 | Dickhut ............................ 446/486 |
| 5,536,054 | * | 7/1996 | Liaw ................................. 294/1.1 |
| 5,571,037 | * | 11/1996 | Sellers ............................... 446/188 |
| 5,586,681 | * | 12/1996 | Policappelli ..................... 220/674 |

* cited by examiner

*Primary Examiner*—Jacob K. Ackun
(74) *Attorney, Agent, or Firm*—Melvin L. Crane

(57) ABSTRACT

A novelty candy holding device for holding a lollipop and making croaking sounds by stretching and bending the main housing into various positions. The device comprises a main housing made of a hollow corrugated plastic or a solid material that is flexible, stretchable and bendable. The upper end of the main housing has a figure attached which has an aperture in the top. The aperture has an expandable sleeve to hold a lollipop. The figure can be made to resemble any form desired, for example, a person, an animal, etc. The lower end of the main housing can be made with an open end to enhance the croaking sound when the housing is stretched. A flat base is attached to the lower end of the main housing for a support and to hold the main housing in an upright position. The base can be made to resemble feet or any form desired. The device has also been designed so the lollipop can be replaced with any type of lollipop desired and the device can provide fun for children of all ages.

3 Claims, 2 Drawing Sheet